Figure 1:
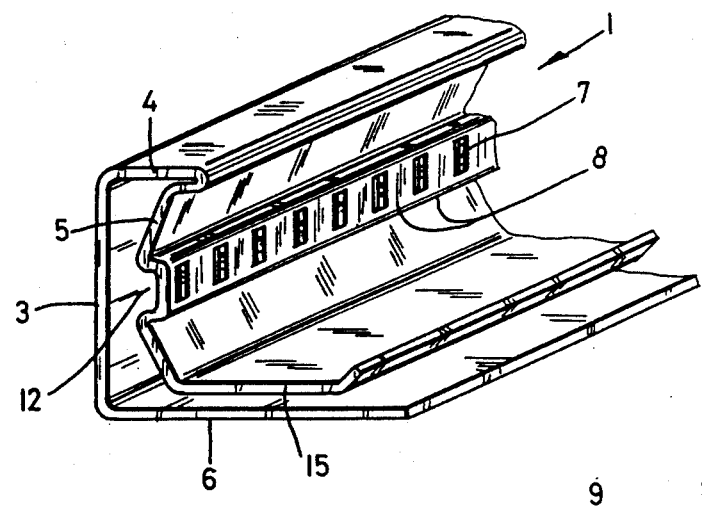

United States Patent [19]

Schauer

[11] Patent Number: 4,725,083
[45] Date of Patent: Feb. 16, 1988

[54] FLANGED JOINT FOR TWO SHEET MATERIAL AIR CHANNEL SECTIONS OF RECTANGULAR CROSS SECTION

[75] Inventor: Markfried Schauer, Barsinghausen, Fed. Rep. of Germany

[73] Assignee: Michael Komotzki, Schwerte, Fed. Rep. of Germany; a part interest

[21] Appl. No.: 19,594
[22] PCT Filed: Apr. 3, 1986
[86] PCT No.: PCT/DE86/00147
  § 371 Date: Dec. 8, 1986
  § 102(e) Date: Dec. 8, 1986
[87] PCT Pub. No.: WO86/05855
  PCT Pub. Date: Oct. 9, 1986

[30] Foreign Application Priority Data

Apr. 6, 1985 [DE] Fed. Rep. of Germany ....... 3512534

[51] Int. Cl.⁴ .............................................. F16L 23/00
[52] U.S. Cl. ..................................... 285/405; 285/424; 403/295
[58] Field of Search ............... 285/363, 364, 365, 405, 285/406, 407, 424, 403; 403/294, 295; 52/656

[56] References Cited

U.S. PATENT DOCUMENTS

| | | | |
|---|---|---|---|
| 3,198,561 | 8/1965 | Witt | 285/364 |
| 3,200,913 | 8/1965 | Nelson . | |
| 3,643,989 | 2/1972 | Sattler . | |
| 4,304,423 | 12/1981 | Mez | 285/424 X |
| 4,461,499 | 7/1984 | Hunter et al. | 285/364 |
| 4,537,430 | 8/1965 | Sullivan | 285/364 |
| 4,542,923 | 9/1985 | LaCrosse | 285/364 X |

FOREIGN PATENT DOCUMENTS

| | | |
|---|---|---|
| 47467 | 3/1982 | European Pat. Off. . |
| 2129170 | 6/1972 | Fed. Rep. of Germany . |
| 2430160 | 1/1976 | Fed. Rep. of Germany . |
| 7721055 | 7/1977 | Fed. Rep. of Germany . |
| 2627515 | 12/1977 | Fed. Rep. of Germany . |
| 2817413 | 10/1979 | Fed. Rep. of Germany . |
| 3203204 | 1/1984 | Fed. Rep. of Germany . |
| 8510251 | 7/1985 | Fed. Rep. of Germany . |
| 1565118 | 4/1969 | France . |
| 36349 | 8/1958 | Luxembourg . |

Primary Examiner—Dave W. Arola
Attorney, Agent, or Firm—Peter K. Kontler

[57] ABSTRACT

A flanged joint for connecting sheet material air channel sections of essentially rectangular cross section to one another has flanges made of hollow sheet material shapes and steel angle pieces. Each of the hollow sheet material shapes is provided with projections and/or depressions in one or more of the walls which entirely or partially surround a leg of a respective steel angle piece. Each leg of a steel angle piece, in turn, is provided with projections and/or depressions which are disposed at the periphery of the leg and are adjusted to the positions of the projections and/or depressions in the hollow sheet material shapes. At least one of the projections then catches in at least one of the depressions upon pushing a leg of a steel angle piece into a hollow sheet material shape.

22 Claims, 7 Drawing Figures

FLANGED JOINT FOR TWO SHEET MATERIAL AIR CHANNEL SECTIONS OF RECTANGULAR CROSS SECTION

The invention relates to a flanged joint for two sheet material air channel sections of rectangular cross section.

Flanged air channel joints having flanges which are formed from hollow sheet material shapes and steel angle pieces are state of the art. A device for joining air channel elements is known from the West German patent No. 32 03 204 and, at its abutting edges, is provided with receptacles for flanged shapes which define corners. The flanges shapes are constituted by double-walled shapes of essentially L-shaped cross section made of bent sheet material. On the one hand, this enables the flanged shapes to grip the walls of the air channel elements from above and below while, on the other hand, this enables the flanged shapes to define the receiving regions for the corners. The walls of the individual regions of the shapes are spaced from, and are substantially parallel to, one another.

These known flanged joints have the drawback that, after insertion of the angle pieces in the hollow sheet material shapes, the angle pieces must be secured in the direction of insertion by grinding or spot welding. This prevents the frame-like flange consisting of four hollow sheet material shapes and four angle pieces from falling apart upon being drawn onto the air channel section.

In view of this drawback, the West German Offenlegungsschrift No. 26 27 515 proposes to produce flanges from hollow shapes and angle pieces with the angle pieces having more than two holes the centers of which are equally spaced from one another. The hollow shapes are formed in such a manner that cups having the same diameter and spacing as the holes in the angle piece are produced on the hollow shape. After the angle pieces are driven in, the cups of the hollow shapes are supposed to be received in the holes of the angle pieces. This flanged joint has been found to be unusable in practice.

The hollow shapes are cut to length in accordance with the desired size of the air channel section. The cut may pass through a cup but can also lie somewhere between two cups. If the angle pieces are now driven in, either all or none of the cups on the hollow shape catch in the holes of the angle piece. Due to the predetermined, technically attainable diameter of the cups and holes, and due also to their uniform spacing, the tolerance for the length of a hollow shape with locked cups and two driven in angle pieces is at most twice the distance between neighboring cups and neighboring holes. For a proposed distance of 1 cm—a smaller distance is virtually unobtainable technically—the length tolerance would be about 19 mm. In practice, however, at most 2 mm is acceptable.

It is not only for this reason, however, that the flanged joint of the West German Offenlegungsschrift No. 26 27 515 cannot be used in practice. If a flange of hollow sheet material shapes and angle pieces is mounted on the ends of the air channel sections without further mechanical processing or spot welding to secure the angle pieces in the hollow sheet material shapes, a large force of engagement must exist between each hollow sheet material shape and angle piece because the flange is driven onto the air channel section with a hammer. Since the force of engagement for the proposed solution with cups and holes is equal to the force required for insertion, production of a flange by driving the angle pieces into the hollow shape with a large force is too time-consuming, wastes too much force and creates too great a danger of injury for the worker.

Another flanged joint in which the angle pieces lock in the hollow shape is known from the West German Offenlegungsschrift No. 24 34 160. Here, a rectangular recess is stamped in the angle piece and a similarly rectangular tongue stamped out of the hollow shape catches therein. While the flanged frame produced in this manner cannot fall apart after the angle pieces are pushed into the hollow sheet material shapes, it is nevertheless unstable because of the required air gap between the tongue of the hollow sheet material shape and the recess in the angle piece.

This flanges joint exhibits further serious drawbacks. The tongue in the hollow sheet material shape, which is necessary for locking, can be stamped only after the individual shaped hollow sheet material sections required for production of the flanged frame have been cut to length. This constitutes an additional processing operation which can be carried out only with a complicated, that is, expensive, stamping tool since the cutting plate of the stamping tool must be inserted in the hollow sheet material shape for the stamping procedure. Moreover, the galvanized surface of the hollow sheet material shape is ruined during the stamping procedure.

It is, therefore, the object of the invention to provide a solution which allows flanged joints constituted by hollow sheet material shapes and angle pieces of steel to be produced in a time-saving, and thus economical, manner without additional fixing of the angle pieces in the direction of insertion by grinding or spot welding. At the same time, it is necessary to ensure that the shaped hollow sheet material sections need not be further processed after being cut into arbitrary lengths, that the assembled flanged area is stable and retains its dimensions, and that the force of engagement between the hollow sheet material shapes and the angle pieces is greater than that to be used in pushing or driving the angle pieces into the hollow sheet material shapes.

According to the invention, the hollow sheet material shape is provided, in the region of insertion of the leg of the angle piece, and preferably in the wall remote from the front face of the channel, with a rack-like pattern perpendicular to the direction of insertion. This can be accomplished by an embossing roller during rolling of the hollow sheet material shape.

The leg of the angle piece to be inserted is provided with several projections in the direction of insertion. The projections have different spacings which are to be selected in such a manner that, upon insertion of the angle piece in the desired final position, at least one projection of the leg of the angle piece engages in a depression of the rack-like pattern of the hollow sheet material shape.

If the projections on the leg of the angle piece are, for example, triangular longitudinally of the leg with the apex of the triangular pointing in the direction of insertion of the angle piece and the triangle sloping from the base to the apex, the angle piece can be pushed to the final position in the hollow sheet material shape by hand without the exertion of great force. The protuberances in the rack-like pattern of the hollow sheet material shape slide over the inclined planes of the projections on the leg of the angle piece. As desired, however, a release of the angle piece from the hollow sheet material shape is no longer possible since the raised base of at least one triangular projection on the leg of the angle piece catches in a depression of the rack-like pattern.

In the known hollow shapes, those wall areas of the hollow sheet material shape which surround the leg of the angle piece extend essentially perpendicular to the surface of the channel, and the moment of resistance of the hollow sheet material shape with respect to the axis extending normal to the surface of the channel is small. The moment of resistance of the hollow sheet material shape in the region of insertion of the angle piece and with respect to the axis extending normal to the surface of the channel is increased considerably relative to the known hollow sheet material shapes. This is achieved by designing that wall of the hollow sheet material shape which is remote from the front face of the channel with a slightly dovetailed groove in such a manner that, beginning from the open side of the groove, those regions of the wall adjacent to the groove are inclined upwards and downwards in a direction away from the front face of the channel.

The form here disclosed for the projections on the leg of the angle piece is only one of many which are possible. The disclosed design also allows for recesses in the area of the leg of the angle piece. It is only necessary to take care that the form of the hollow sheet material shape is selected in such a manner that the hollow sheet material shape and the angle piece lock to one another as desired in the final position.

Due to the structure of the projections and depressions in accordance with the invention, an arbitrarily small grid dimension may be achieved for the flange frame. After cutting the hollow sheet material shape to length, no further processing operation, as in the West German Offenlegungsschrift No. 24 34 160, is required. The force of engagement between the leg of the angle piece and the hollow sheet material shape is substantially greater than the force of insertion in contrast to the teaching of the West German Offenlegungsschrift No. 26 27 515 where the two forces are equal. It is true that the arrangement known from the West German Offenlegungsschrift No. 28 17 413 allows the grid dimension to be halved. However, no suggestion of an arbitrary reduction in the grid dimension is to be found in this publication.

Figure 2:
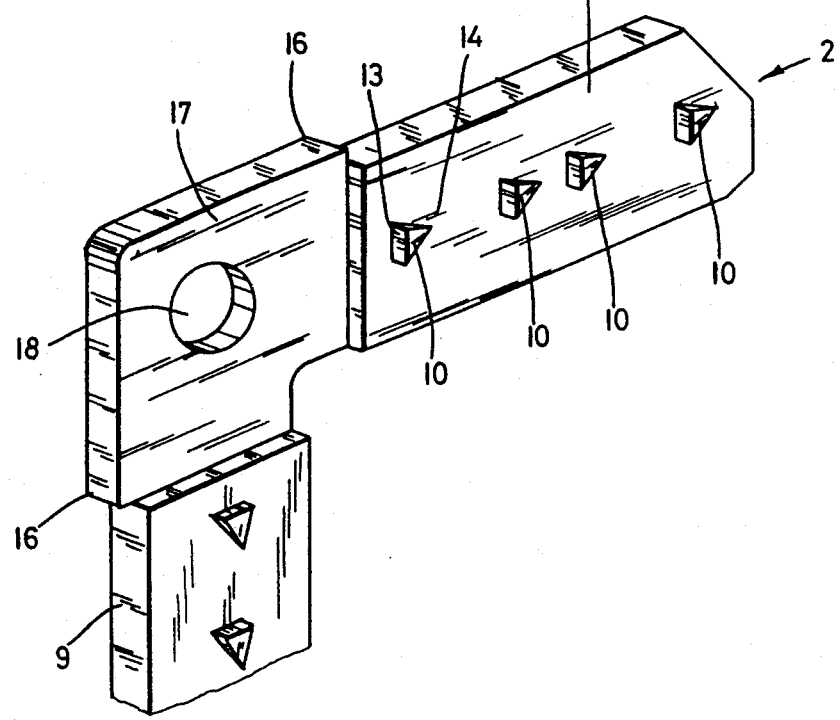
Figure 3:
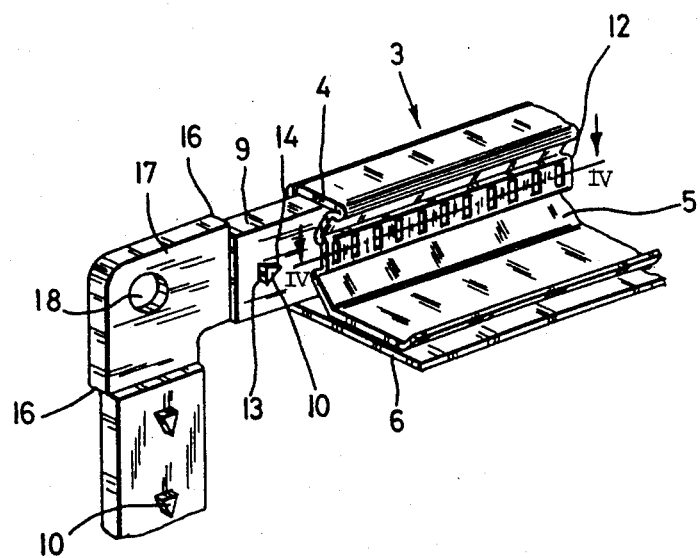
Figure 4:
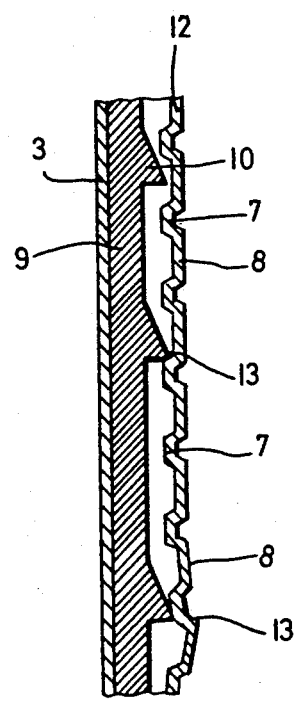
Figure 5:
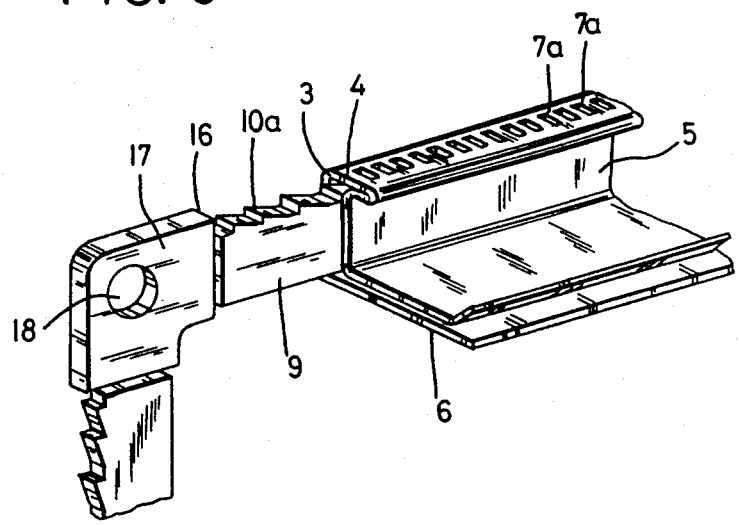
Figure 6:
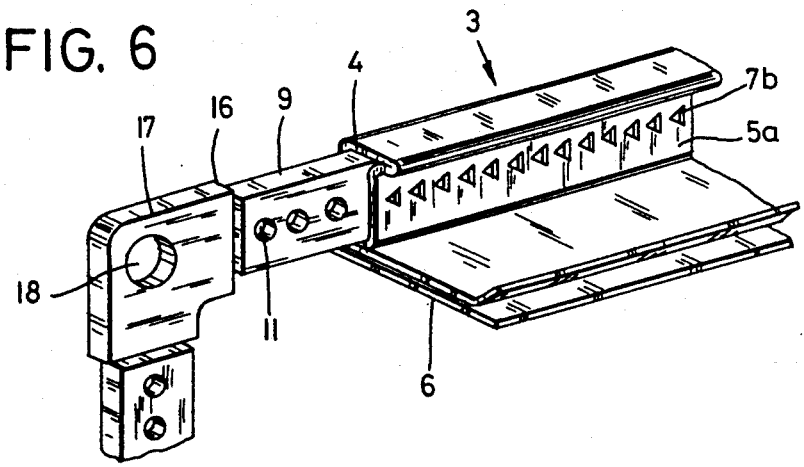
Figure 7:
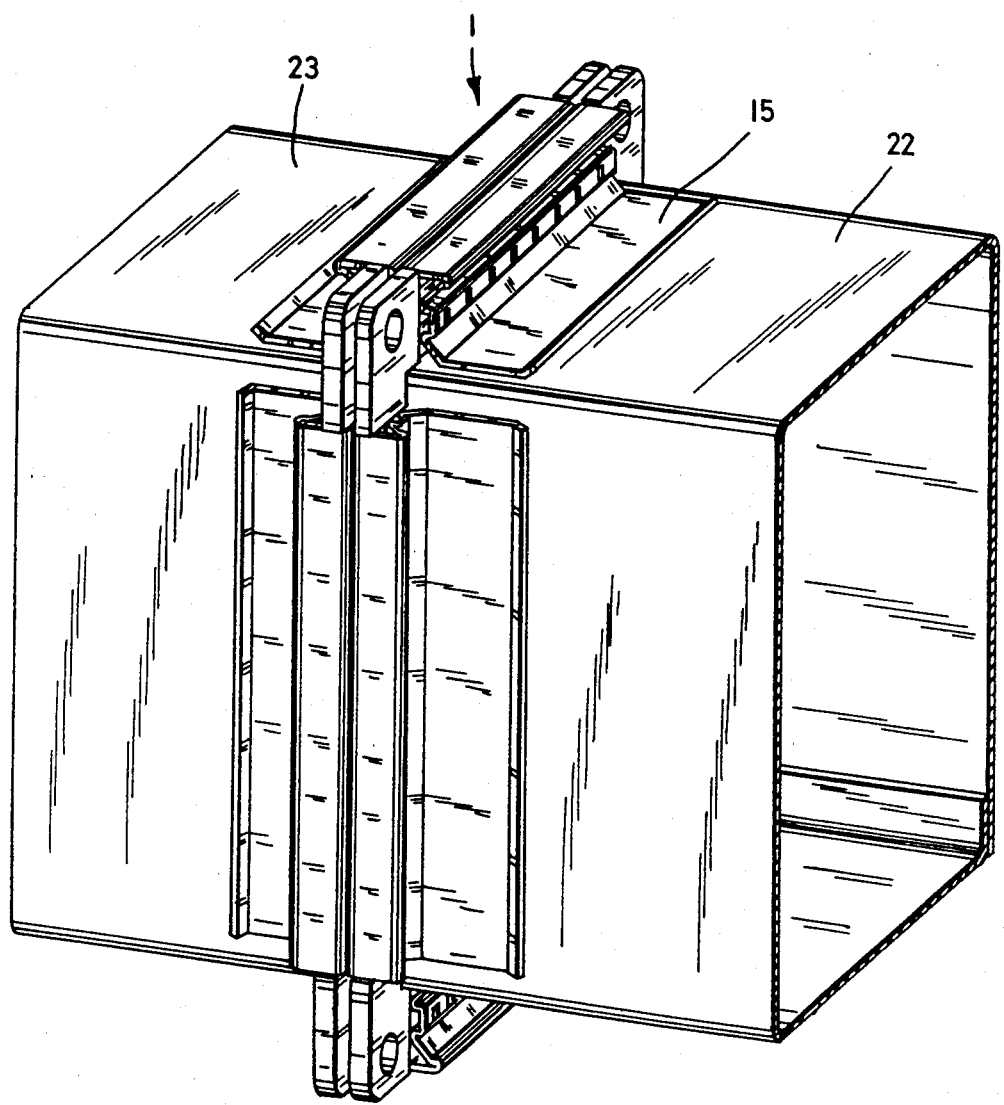

Exemplary embodiments of the invention are illustrated in the drawings and are described below in detail. In the drawings:

FIG. 1 is a perspective view of a hollow sheet material shape as seen from the side remote from the front face of the channel, FIG. 2 is a perspective view of an angle piece as seen from the side remote from the front face of the channel, FIG. 3 is a perspective view of a hollow sheet material shape with a partially inserted angle piece as seen from the side remote from the front face of the channel, FIG. 4 is a section through the greatly reduced hollow shape illustrated in FIG. 3 as seen in the direction of the arrows IV-IV, FIG. 5 is a perspective view of one embodiment of a hollow sheet material shape with partially inserted angle piece as seen from the side remote from the front face of the channel, FIG. 6 is similar to FIG. 5 but shows another embodiment, and FIG. 7 is a diagrammatic view of a joint between two air channel sections.

FIG. 1 illustrates a hollow sheet material shape 1 consisting of the wall 3 nearer to the front face of the channel, the wall 5 remote from the front face of the channel, a partially double-walled wall 4 bridging these two walls, and the walls 6 and 15 between which the channel wall of the air channel section 22 or 23 (see FIG. 7) is inserted. A slightly dovetailed groove 12 with protuberances 7 and depressions 8 extends parallel to the surface of the channel in the wall 5 remote from the front face of the channel.

FIG. 2 illustrates an angle piece 2 with one of the legs 9 to be inserted. The second leg 9 is only partly shown. Triangular projections 10 are arranged in such a manner that they slope from the base 13 to the apex 14 in the direction of insertion. In order that the angle piece 2 may be pushed to its final position in the hollow sheet material shape 1 illustrated in FIG. 1, the ends of the legs 9 of the angle piece 2 are provided with shoulders 16 which abut the wall 4 of the hollow sheet material shape 1 in the final position. A bore 18 for bolting together a pair of assembled flanges is provided in the portion 17 of the angle piece 2 which connects the two legs 9 of the angle piece 2 to one another.

FIG. 3 illustrates a hollow sheet material shape 1 with a partially inserted angle piece 2. On the one hand, the inserted leg 9 is guided by the walls 3, 4 and 6. On the other hand, it is guided by means of the bases 13 of the triangular projections 10, along the walls of the groove 12 which extend approximately parallel to the surface of the channel.

FIG. 4 shows in section how the leg 9 of the angle piece 2 is arrested in the hollow sheet material shape 1 in the final position where the shoulder 16 of the angle piece 2 bears against the wall 4 of the hollow sheet material shape 1. Due to the non-uniform spacings between the projections 10 on the leg 9, one of the projections 10 lies in one of the depressions 8 of the groove 12 with clearance, one of the projections 10 bears against one of the protuberances 7 of the groove 12, e.g., with its base 13, and thereby slightly deforms the wall of the groove 12, and one of the projections 10 of the leg 9 catches in one of the depressions 8 of the groove 12 with its base 13 and prevents a release of the angle piece 2 from the hollow sheet material shape 1.

In the embodiment illustrated in FIG. 5, protuberances 7a formed in the wall 4 define the rack-like pattern in the hollow sheet material shape. Accordingly, the projections 10a on the leg 9 of the angle piece are located on that portion of the periphery of the leg 9 which confronts the wall 4.

In the embodiment shown in FIG. 6, the protuberances 7b are formed in the wall 5a while the corresponding recesses 11 in the leg 9 are constituted by bores.

I claim:

1. A joint for connecting a pair of ducts, particularly air ducts of sheet material, to one another, comprising at least one flange member designed to be mounted on one of the ducts, said one flange member including wall means arranged to project outwardly from, and to define a flange for, the respective duct, and said wall means defining a space having an open end; and at least one connecting member including a pair of legs extending at an angle to one another, at least one of said legs being receivable in said space via said open end, and said wall means extending circumferentially of said space so as to confine said one leg therein, said wall means and said one leg being provided with respective rows of cooperating arresting elements designed to arrest said one leg against removal from said space, and the arresting elements of one of said rows having a substantially uniform spacing, the arresting elements of the other of said rows having a non-uniform spacing.

2. The joint of claim 1, comprising an additional flange member resembling said one flange member and designed to be mounted on the other duct, and an additional connecting member resembling said one connecting member and designed to cooperate with said additional flange member.

3. The joint of claim 2, wherein each of said connecting members has an intermediate portion which joins the respective legs to one another, each of said intermediate portions being provided with an opening, and said openings being arranged to register with one another when said members are mounted on the respective ducts to thereby permit insertion of a connector in said openings.

4. The joint of claim 2, wherein the ducts have confronting end faces and each of said flange members is designed to be mounted in the region of the end face of the respective duct.

5. The joint of claim 1, wherein the ducts are polygonal and said one flange member is designed to be mounted on a first side of the respective duct; and further comprising another flange member resembling said one flange member and designed to be mounted on an adjacent second side of the duct, the other leg of said one connecting member resembling said one leg and being designed to cooperate with said other flange member when said flange members are mounted on the first and second sides of the respective duct.

6. The joint of claim 1, wherein said wall means comprises spaced first and second walls designed to project outwardly from, and to be spaced longitudinally of, the respective duct, and a third wall extending between said first and second walls, said walls bounding said space.

7. The joint of claim 1, wherein the arresting elements of a first one of said rows comprise projections and the arresting elements of the second row comprise recesses.

8. The joint of claim 7, said one leg being insertable in and removable from said space by moving said one leg and said one flange member relative to one another along a predetermined direction; and wherein said projections are substantially triangular and each of said projections has a side, an apex opposite the respective side and spaced from the latter along said predetermined direction, and a substantially triangular surface extending between the respective side and apex, each of said sides protruding from the respective member to a greater degree than the respective apex so that said triangular surfaces are inclined along said predetermined direction.

9. The joint of claim 8, wherein said apices are substantially flush with the respective member.

10. The joint of claim 8, said one leg having a free end; and wherein said projections are provided on said one leg and each of said apices is disposed between the respective side and said free end.

11. The joint of claim 10, wherein said projections have a non-uniform spacing.

12. The joint of claim 1, wherein the ducts have confronting end faces and said one flange member is designed to be mounted in the region of the end face of the respective duct, said wall means including spaced first and second walls designed to project outwardly from, and to be spaced longitudinally of, the respective duct, and said walls bounding said space, said first wall being located nearer the end face of the respective duct than said second wall when said one flange member is mounted on the duct, and the arresting elements of said wall means being provided in said second wall.

13. The joint of claim 12, wherein the arresting elements of said wall means comprise recesses and the arresting elements of said one leg comprise projections, said second wall being provided with a groove designed to receive said projections.

14. The joint of claim 13, said groove having a base; and wherein said recesses are provided in said base.

15. The joint of claim 1, wherein said wall means comprises spaced first and second walls designed to project outwardly from, and to be spaced longitudinally of, the respective duct, and a third wall extending between said first and second walls, said walls bounding said space, and the arresting elements of said wall means being provided in said third wall.

16. The joint of claim 15, wherein the arresting elements of said wall means comprise first projections and the arresting elements of said one leg comprise second projections.

17. The joint of claim 16, wherein said second projections have a sawtooth-like configuration.

18. The joint of claim 1, wherein said one row is provided in said wall means.

19. The joint of claim 18, wherein the arresting elements of said wall means comprise recesses and the arresting elements of said one leg comprise projections.

20. The joint of claim 18, wherein the arresting elements of said wall means comprise first projections and the arresting elements of said one leg comprise second projections.

21. The joint of claim 18, wherein the arresting elements of said wall means comprise projections and the arresting elements of said one leg comprise recesses.

22. A duct assembly, comprising a pair of ducts having confronting end faces; and a joint for connecting said ducts to one another, said joint including a pair of first flange members mounted on one of said ducts in the region of the respective end face, and a pair of second flange members mounted on the other of said ducts in the region of the respective end face, each of said flange members comprising wall means projecting outwardly from, and defining a flange for, the respective duct, and each of said wall means defining a space having an open end, said joint further including a first connecting member having a pair of legs which extend at an angle to one another and into the respective spaces of said first flange members via the respective open ends, and a second connecting member having a pair of legs which extend at an angle to one another and into the respective spaces of said second flange members via the respective open ends, each of said connecting members having an intermediate portion which joins the respective legs to one another, and each of said intermediate portions being provided with an opening, said openings being in register to thereby permit insertion of a connector therein, and each wall means extending circumferentially of the corresponding space so as to confine the respective leg in such space, each wall means and associated leg being provided with respective rows of cooperating arresting elements designed to arrest the leg against removal from the respective space, and the arresting elements of one row of each wall means-leg combination having a substantially uniform spacing, the arresting elements of the other row of each wall means-leg combination having a non-uniform spacing.

* * * * *